July 21, 1959 P. MATTY 2,895,403
CIRCULATING BEVERAGE PUMPS
Filed Aug. 14, 1957 2 Sheets-Sheet 1
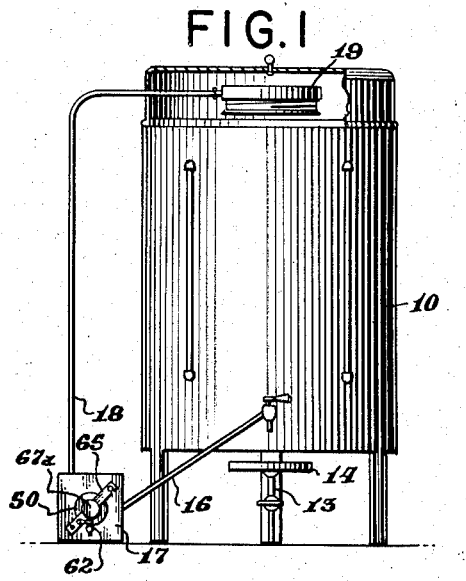
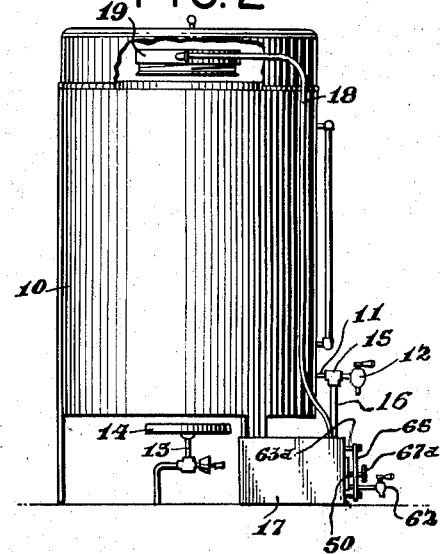
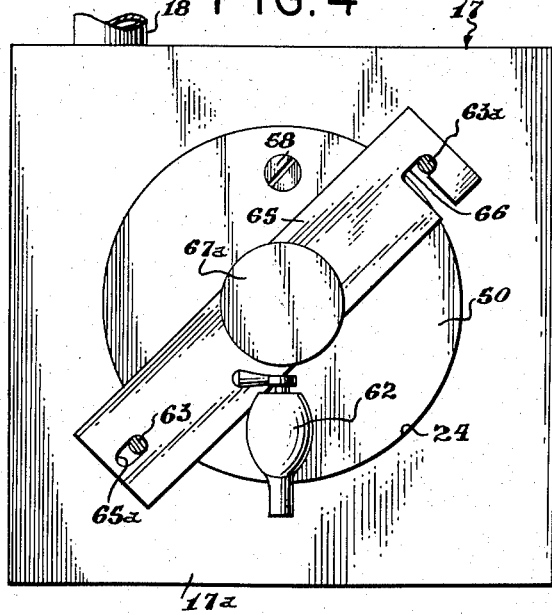
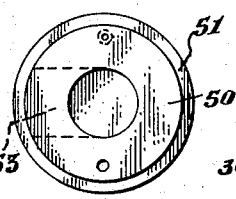
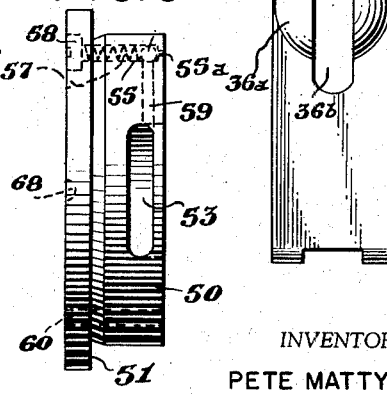
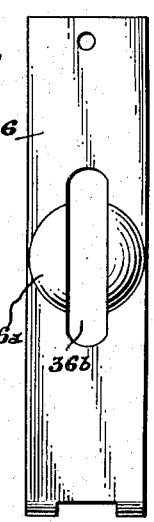
INVENTOR
PETE MATTY
BY *Eugene E. Stevens, III*
ATTORNEY

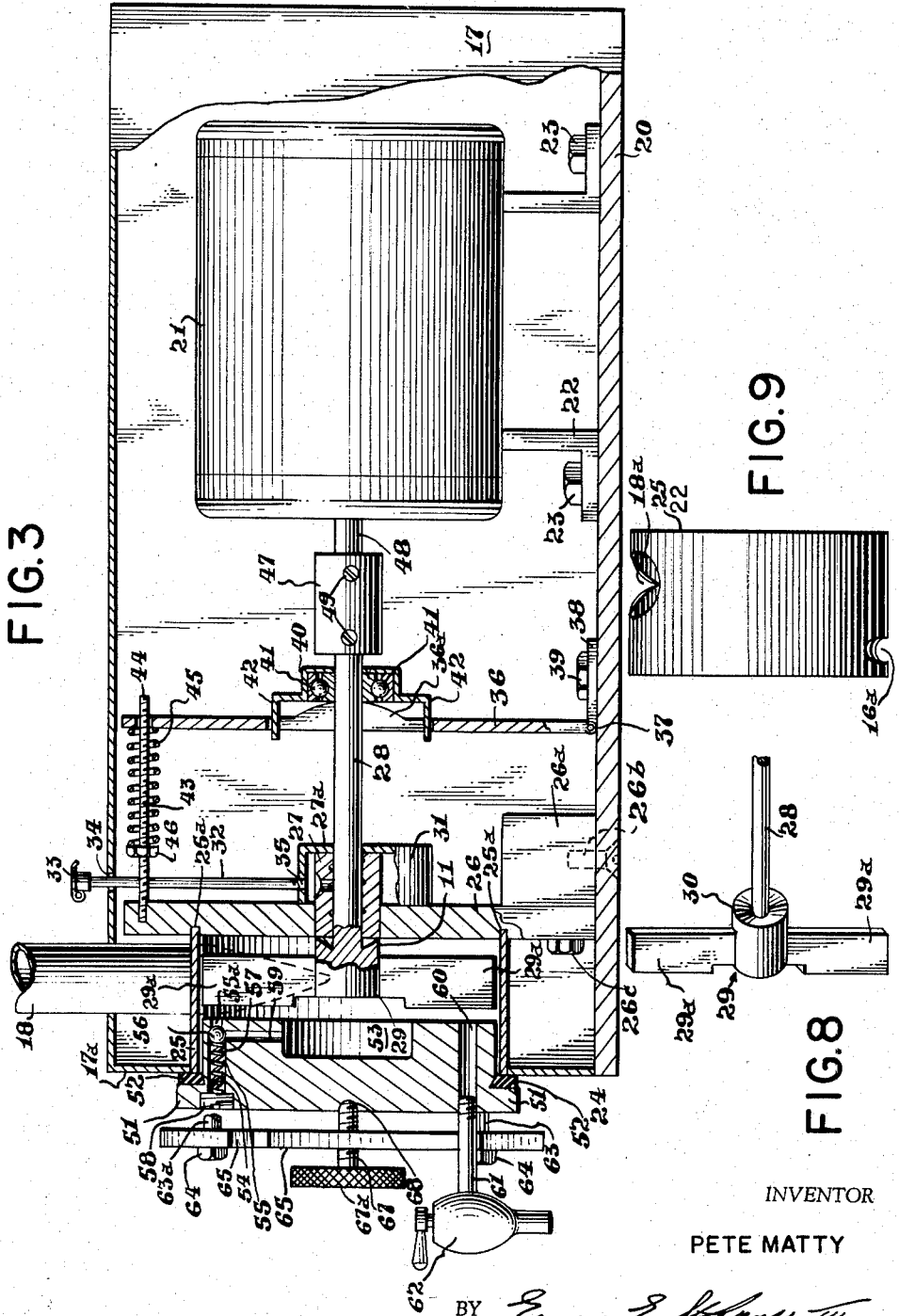

United States Patent Office 2,895,403
Patented July 21, 1959

2,895,403

CIRCULATING BEVERAGE PUMPS

Pete Matty, Washington, D.C.

Application August 14, 1957, Serial No. 678,056

8 Claims. (Cl. 99—309)

My invention relates to improvements in circulating beverage pumps, and more specifically to a pump which permits the operator to clean the interior of the pump and the piping when the urn is empty.

To remove the flavor from the ground coffee the capacity of the urn is usually recirculated by drawing coffee brew from the faucet at the bottom of the urn in a vessel and pouring same into the top of the urn over the ground coffee. This is a time consuming and dangerous practice. Circulating pumps have been used to speed the flow of coffee brew over the coffee grounds and to eliminate the danger of scalding to the operator; however, the pumps are extremely difficult to clean as special tools, etc. are necessary to open the pump casing.

Therefore, it is an object of my invention to provide a circulating pump for use with a coffee urn which is easy to keep clean.

Another object of my invention is to provide a circulating pump which can be opened at one end without the aid of tools or a skilled operator.

A further object of my invention is to provide removable fastening means for securing the open end of the pump in a closed condition.

Another object of my invention is to provide a pump that is inexpensive to manufacture, to sell and to use.

Other objects and advantages of my invention will be apparent during the course of the following description.

In the accompanying drawing, forming a part of this application, and in which like numerals are employed to designate like parts throughout the same—

Fig. 1 is a front elevational view of my invention attached to a coffee urn;

Fig. 2 is a side elevational view of my invention as shown in Fig. 1;

Fig. 3 is a side elevational view of the pump partly shown in section;

Fig. 4 is an end view of the pump;

Fig. 5 is a reduced view of the inner end of the closure plug;

Fig. 6 is a side elevational view of the closure plug;

Fig. 7 is a side elevational view of the drive shaft tensioning bracket;

Fig. 8 is a side elevational view of the impeller-seal; and

Fig. 9 is a front elevational view of the impeller housing.

In the drawing wherein for the purpose of illustration is shown a preferred embodiment of my invention, the numeral 10 indicates a conventional coffee urn having an outlet pipe 11 and a faucet 12. Any suitable heating means can be employed such as the gas pipe assembly 13 and the burner 14.

A union 15 is attached to the pipe 11 and a pipe 16 is threaded in the union 15 which carries the coffee brew (not shown) from the urn 10 into the pump housing generally indicated at 17. The coffee brew is then forced up the pipe 18 and into a sprinkler 19 which is mounted in the top portion of the urn 10.

Turning to the pump housing 17, 20 indicates a floor. An electric motor 21 or the like is mounted in one end of the housing 17 by any suitable means such as the L-shaped brackets 22 and the bolts 23.

A large circular opening 24 is provided in the end wall 17a of the housing 17. Positioned in the opening 24 and into the housing 17 is an impeller housing 25 which is circular in cross section and is of substantial width. The impeller housing 25 contains an outlet opening 18a for the pipe 18 in its upper surface, and an inlet opening 16a for the pipe 16 (see Fig. 9).

A wall 26 is detachably mounted in the housing 17 by being secured to a boss 26a by screws 26c which wall is in turn held to the floor 20 by screws of the like 26b. The wall 26 does not engage the top of the housing 17, and as shown in Fig. 3 a space is left so that the wall when dismantled can be readily removed to provide access to the motor and other parts of the pump to be described later. The impeller housing 25 has its rear edge 25a imbedded in the wall 26. Extending through and protruding on the far side of the wall 26 is a bearing 27 for the impeller drive shaft 28. A bearing housing 27a encloses the bearing 27 and contains an oil well 31 which supplies oil to the bearing and a seal 30. An oil wick 32 having a conventional cap 33 extends through an opening 34 in the top of the pump housing 17 and is threaded in the opening 35 in the bearing housing 27a. An impeller 29 is carried by the drive shaft 28 at one end thereof and has blades 29a extending through a circular seal member 30 (see Fig. 8) on opposite sides thereof.

The seal 30 is held back against the bearing 27 by an idle arm 36 which is hingedly connected as at 37 to a base member 38. A bolt 39 secures the base member 38 to the floor 20.

A bearing housing 40 having roller bearings 41 therein is slidably mounted on the idle arm 36 by L-shaped brackets 42. The portion of the idle arm 36 within the brackets 42 is enlarged to provide a rounded circular shoulder 36a which engages the bearing housing 40.

A shaft receiving slot 36b extends through the mid portion of the shoulder 36a and an adjoining portion of the idle arm 36 on either side of the shoulder 36a (see Fig. 7); the rounded shoulder 36a of the idle arm 36 permits tension to be applied to the seal 30 without binding the roller bearings 41. A threaded rod 43 is secured to the upper portion of the wall 26 and extends loosely through an opening 44 in the idle arm 36. A coil spring 45 is positioned on the rod and bears against the idle arm 36. An adjusting nut 46 is threaded on the rod 43 and holds the coil spring against the idle arm 36. The proper tension is supplied to the seal 30 and the idle arm 36 by the spring 45. The spring tension can be increased or decreased by the adjusting nut 46.

The shaft 28 extends through the slot 36b and the bearing housing 40, and is connected to the motor by any suitable means such as the coupling 47 which joins the shaft 28 to the motor drive shaft 48 and is secured in position by set screws 49.

Going back now to the end wall 17a of the pump housing 17, the opening 24 receives a removable plug 50 having an enlarged flange portion 51. A gasket 52 is secured by any suitable means to the inner surface of the flange 51 which seals the opening 24. The outer edge 25b of the impeller housing 25 engages the gasket 52. The plug 50 has an opening 53 on one side for passage of the inlet pipe 16 which passes through an opening (not shown) in the side wall of the housing 17 (see Fig. 1) and through the opening 53 in the plug 50 and into the impeller housing 25 through opening 16a. A safety valve assembly 54 extends through the upper portion of the plug 50 by passageway 55. The passageway 55 terminates in a smaller opening 55a which extends into the impeller housing 25. The safety valve comprises a ball check 56 secured against the opening 55a by a spring 57. A set screw 58 holds the spring 57 in position. A second passageway 59 beneath the ball check 56 communicates with the opening 53 so that if the pressure in the impeller housing 25 is too great, the valve assembly will permit the coffee brew to flow through the opening 55a and passageway 59 into the pipe 16.

A drain pipe passageway 60 extends through the lower portion of the plug 50 and communicates with the impeller housing 25. The drain pipe 61 extends through a portion of the passageway 60. A faucet 62 is provided on the end of the pipe 61 to permit coffee brew to be drained out of the impeller housing prior to the removal of the plug 50.

A pair of studs 63 and 63a are mounted in the end wall 17a as shown in Fig. 4, and have bolt heads 64 (see Fig. 3). Interposed between the bolt heads 64 and the end wall 17a is a cross bar 65 having an elongated slot 65a in the lower portion through which the stud 63 passes, and a bayonet slot 66 in its upper portion which engages the stud 63a when in the closed position. A bolt 67 carrying a knob 67a is threaded through the center of the cross bar 65 and seats in a recess 68 in the center of the outer surface of the plug 50.

In operation, the coffee brew is drawn from the urn through the pipe 16 and into the impeller housing 25. The impeller 29 rotating on the shaft 28 which is motor driven, forces the liquid up the pipe 18 and through the sprinkler 19 onto the bag of coffee grounds (not shown) in the top of the urn. When it is necessary to clean the pump, the coffee brew is first drained from the urn through the faucet 12 and then from the impeller housing 25 through the faucet 62. The knob 67a is turned which unthreads the bolt 67 from the opening 68 in the cross bar 65 thereby loosening the engagement of the bolts 64 with the cross bar 65 and permitting same to be moved upward to disengage the bayonet slot 66 from the stud 63a. The cross bar 65 is then free to pivot on the stud 63 and permits the plug 50 carrying the faucet 62 and drain pipe 61 to be pulled out of the opening 24 in the end wall 17a thereby affording access to the impeller housing and the pipes for cleaning purposes.

It is understood that the form of my invention herewith shown and described is to be taken as a preferred example of the same, and that various changes in the shape, size and arrangement of parts may be resorted to without departing from the spirit and scope of my invention, as hereinafter claimed.

Having thus described my invention, I claim:

1. In a circulating pump for coffee urns or the like having a housing with inlet and outlet pipe openings and a large opening in one wall providing free access to the interior of said housing for cleaning same, an impeller housing adjacent said large opening having inlet and outlet pipe openings, an inlet pipe extending from said urn through said inlet openings in said housing and in said impeller housing, an outlet pipe extending through said outlet openings in said impeller housing and in said pump housing and back into said urn, an impeller rotatably journalled in said impeller housing, drive means for rotating said impeller, a detachable plug having opposed ends, one end of said plug extending into said large opening in said wall of said housing and extending substantially into said impeller housing, the other end of said plug having an enlarged flange portion overlying said large opening, a gasket secured to said flange portion, said first mentioned end having a recess receiving said inlet pipe, a cross bar positioned over the second mentioned end of said plug and extending beyond said end of said plug on both sides, said cross bar having slots at both ends thereof, a bolt extending through said slots of said cross bar at both ends thereof and embedded in said wall, one of said slots being a bayonet slot whereby the cross bar can be removed from one blot, screw means extending through said cross bar and engaging said plug whereby said plug is secured in sealed relationship to said opening.

2. The structure of claim 1, wherein said first mentioned end of said plug has an L-shaped passageway communicating with said impeller housing at one end thereof and with said inlet pipe recess at the other end, a second passageway having a diameter greater than the diameter of said L-shaped passageway extending transversely through said plug and communicating with said L-shaped passageway, a ball check valve having a diameter substantially the same as that of said second passageway, a spring positioned in said second passageway whereby said ball check valve is positioned to prevent entry of the coffee brew in the first mentioned passageway which connects with the inlet pipe recess, and means tensioning said ball check valve in said position.

3. In a circulating pump for coffee urns or the like having a housing with inlet and outlet pipe openings and a large opening in one wall providing free access to the interior of said housing for cleaning or repairing same, an impeller housing having an open end adjacent said large opening and a shaft receiving hole in its opposite end having a bearing therein, said impeller housing having inlet and outlet pipe openings, an inlet pipe extending from said urn through said inlet openings in said housing and in said impeller housing, an outlet pipe extending through said outlet openings in said impeller housing and in said pump housing and back into said urn, a detachable plug having opposed ends, one end of said plug extending into said large opening in said wall of said housing and extending substantially into said impeller housing, the other end of said plug having an enlarged flange portion overlying said large opening, a gasket secured to said flange portion, said first mentioned end having a recess receiving said inlet pipe, a cross bar positioned over the second mentioned end of said plug and extending beyond said end of said plug on both sides, said cross bar having slots at both ends thereof, a bolt extending through said slots of said cross bar at both ends thereof and embedded in said wall, one of said slots being a bayonet slot whereby the cross bar can be removed from one bolt, screw means extending through said cross bar and engaging said plug whereby said plug is secured in sealed relationship to said opening, an impeller rotatably journalled in said impeller housing comprising a central portion, at least two blade members, a rotatable shaft extending from said central portion through said hole in said impeller housing, said central portion being concaved adjacent said shaft and engaging said bearing thereby providing a liquid tight seal, a motor in said pump housing having a rotatable drive shaft connected thereto, means connecting both of said shafts in a horizontal alignment, and means for maintaining tension on said seal thereby preventing leakage through said hole in said impeller housing.

4. The structure of claim 3, wherein said means for maintaining tension comprises an idle arm positioned in said pump housing between said motor and said impeller housing having an off-set shoulder portion and an elongated longitudinal shaft receiving slot extending above and below said shoulder portion and having a hole in its upper portion, a bearing mounted on said shaft carried by said idle arm adjacent said shoulder portion, a threaded rod of a diameter less than that of said hole in the upper portion of said idle arm having one end secured to the interior of the housing and its other end extending freely through said hole in said idle arm, a coil spring mounted on said rod and bearing against said idle arm, and an adjusting nut threaded on said rod at the end of said spring opposite said idle arm whereby said spring can be tensioned against said idle arm thereby tightening said seal.

5. The structure of claim 3, wherein said first mentioned end of said plug has an L-shaped passageway communicating with said impeller housing at one end thereof and with said inlet pipe recess at the other end, a second passageway having a diameter greater than the diameter of said L shaped passageway extending transversely through said plug and communicating with said L shaped passageway, a ball check valve having a diameter substantially the same as that of said second passageway, a spring positioned in said second passageway whereby said ball check valve is positioned to prevent entry of the coffee brew in the first mentioned passageway which connects with the inlet pipe recess, and means tensioning said ball check valve in said position.

6. In a circulating pump for coffee urns or the like having a housing with inlet and outlet pipe openings and a large opening in one wall providing free access to the interior of said housing for cleaning or repairing same, a partition having a hole therein and a bearing journalled in said hole dividing said housing into forward and rear compartments, an impeller housing having open end portions adjacent said large opening in said forward compartment, one of said ends of said impeller housing being embedded in said partition, said impeller housing having inlet and outlet pipe openings, an inlet pipe extending from said urn through said inlet openings in said housing and in said impeller housing, an outlet pipe extending through said outlet openings in said impeller housing and in said pump housing and back into said urn, a detachable plug having opposed ends, one end of said plug extending into said large opening in said wall of said housing and extending substantially into said impeller housing, the other end of said plug having an enlarged flange portion overlying said large opening, a gasket secured to said flange portion, said first mentioned end having a recess receiving said inlet pipe, a cross bar positioned over the second mentioned end of said plug and extending beyond said end of said plug on both sides, said cross bar having slots at both ends thereof, a bolt extending through said slots of said cross bar at both ends thereof and embedded in said wall, one of said slots being a bayonet slot whereby the cross bar can be removed from one bolt, screw means extending through said cross bar and engaging said plug whereby said plug is secured in sealed relationship to said opening, an impeller rotatably journalled in said impeller housing comprising a central portion, at least two blade members, a rotatable shaft extending from said central portion through said hole in said partition, said central portion being concaved adjacent said shaft and engaging said bearing thereby providing a liquid tight seal, a motor in said rear compartment having a rotatable shaft connected thereto, means connecting both of said shafts in horizontal alignment, and means for maintaining tension on said seal thereby preventing leakage through said hole and bearing in said partition.

7. The structure of claim 6, wherein said means for maintaining tension comprises an idle arm positioned in said rear compartment having an off-set shoulder portion and an elongated longitudinal shaft receiving slot extending above and below said shoulder portion and having a hole in its upper portion, a bearing mounted on said shaft carried by said idle arm adjacent said shoulder portion, a threaded rod of a diameter less than that of said hole in the upper portion of said idle arm having one end embedded in said partition and its other end extending freely through said hole in said idle arm, a coil spring mounted on said rod and bearing against said idle arm, and an adjusting nut threaded on said rod at the end of said spring opposite said idle arm whereby said spring can be tensioned against said idle arm thereby tightening the seal.

8. The structure of claim 6 wherein said first mentioned end of said plug has an L shaped passageway communicating with said impeller housing at one end thereof and with said inlet pipe recess at the other end, a second passageway having a diameter greater than the diameter of said L shaped passageway extending transversely through said plug and communicating with said L shaped passageway, a ball check valve having a diameter substantially the same as that of said second passageway, a spring positioned in said second passageway whereby said ball check valve is positioned to prevent entry of the coffee brew in the as mentioned passageway which connects with the inlet pipe recess, and means tensioning said ball check valve in said position.

References Cited in the file of this patent

UNITED STATES PATENTS

| Number | Name | Date |
|---|---|---|
| 755,041 | Peterman | Mar. 22, 1904 |
| 941,009 | Caouchois | Nov. 23, 1909 |
| 1,249,818 | Pedersen | Dec. 11, 1917 |
| 1,482,581 | Pedersen | Feb. 5, 1924 |
| 1,630,904 | Reckard | May 31, 1927 |
| 1,638,969 | Tinsley | Aug. 16, 1927 |
| 1,955,549 | Janette | Apr. 17, 1934 |
| 2,205,747 | Klauss | June 25, 1940 |
| 2,343,752 | Curtis | Mar. 7, 1944 |
| 2,463,360 | Dawson | Mar. 1, 1949 |
| 2,552,169 | Graham | May 8, 1951 |
| 2,667,827 | Peters | Feb. 2, 1954 |
| 2,748,689 | Rotman | June 5, 1956 |